J. A. HAGERSTROM.
TYPE WRITING MACHINE.
APPLICATION FILED SEPT. 25, 1907.

938,480.

Patented Nov. 2, 1909.
4 SHEETS—SHEET 2.

J. A. HAGERSTROM.
TYPE WRITING MACHINE.
APPLICATION FILED SEPT. 25, 1907.

938,480.

Patented Nov. 2, 1909.
4 SHEETS—SHEET 3.

J. A. HAGERSTROM.
TYPE WRITING MACHINE.
APPLICATION FILED SEPT. 25, 1907.

938,480.

Patented Nov. 2, 1909.
4 SHEETS—SHEET 4.

WITNESSES
H. G. Dieterich
H. Alfred Jauke

INVENTOR
John A. Hagerstrom
BY
ATTORNEYS

UNITED STATES PATENT OFFICE.

JOHN A. HAGERSTROM, OF BROOKLYN, NEW YORK, ASSIGNOR TO VICTOR TYPEWRITER COMPANY, OF NEW YORK, N. Y., A CORPORATION OF NEW YORK.

TYPE-WRITING MACHINE.

938,480.          Specification of Letters Patent.        Patented Nov. 2, 1909.

Application filed September 25, 1907. Serial No. 394,436.

*To all whom it may concern:*

Be it known that I, JOHN A. HAGERSTROM, a citizen of the United States, and a resident of the borough of Brooklyn, county of Kings, and State of New York, have invented a new and useful Improvement in Type-Writing Machines, of which the following is a specification.

My invention refers broadly to escapement mechanism and in particular to the arrangement of the dogs by the oscillation of which the escapement wheel performs its step by step motion, causing in turn by this motion the dogs to move positively as required.

Furthermore, my invention relates to a particular arrangement of the operating dogs by means of which the escapement wheel is caused to perform its forward motion equal to the distance between two teeth in two steps, a smaller and a larger step, or a larger and then a smaller step, at will.

My invention is illustrated in the accompanying drawings in which—

Figure 1:
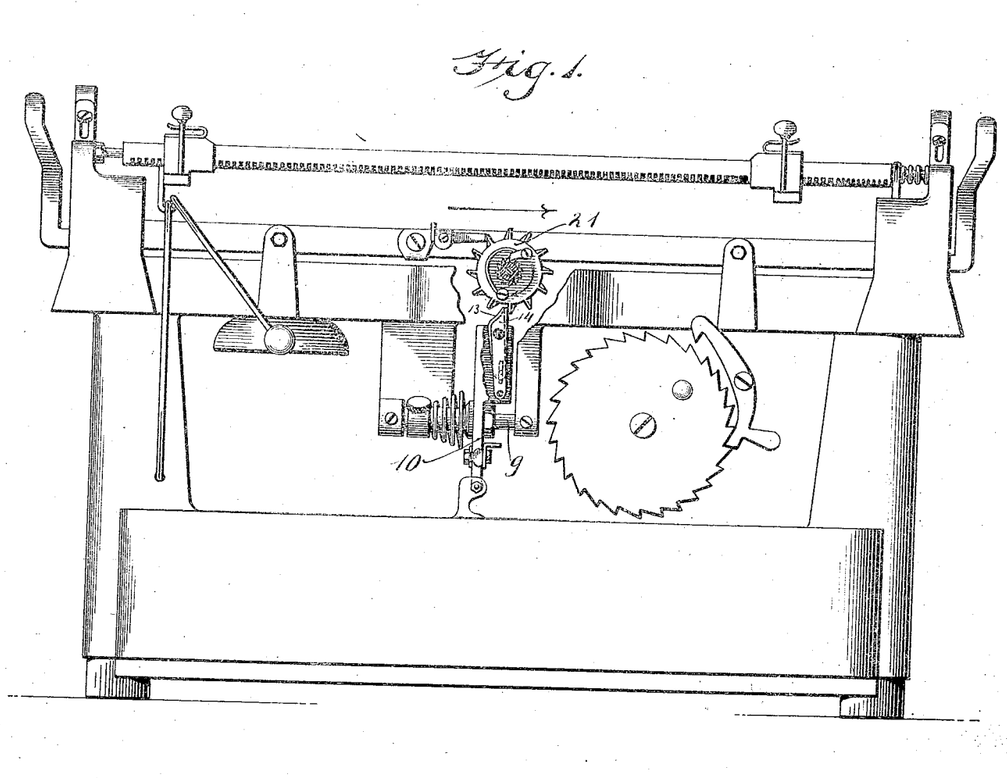
Figure 1 is a rear view of typewriting machine showing the location of the escapement mechanism.
Figure 2:
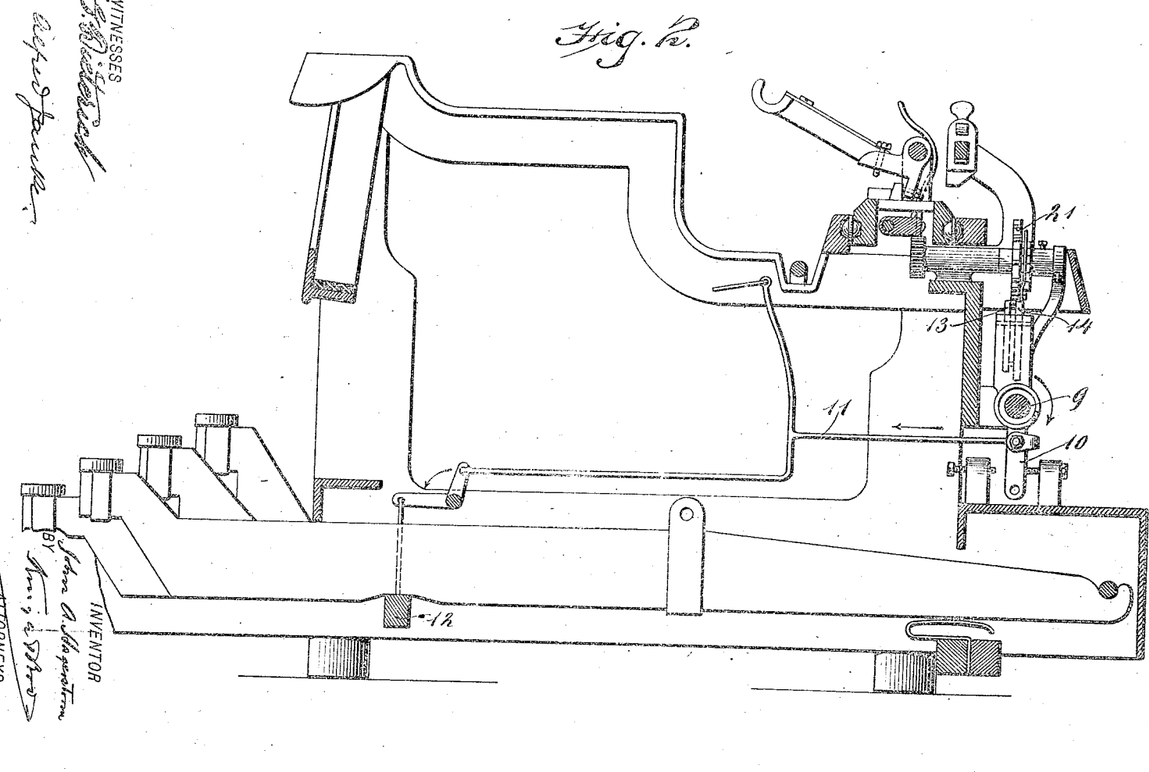
Fig. 2 is a side view of the machine.
Figures 3, 4, 5, 6, 7:
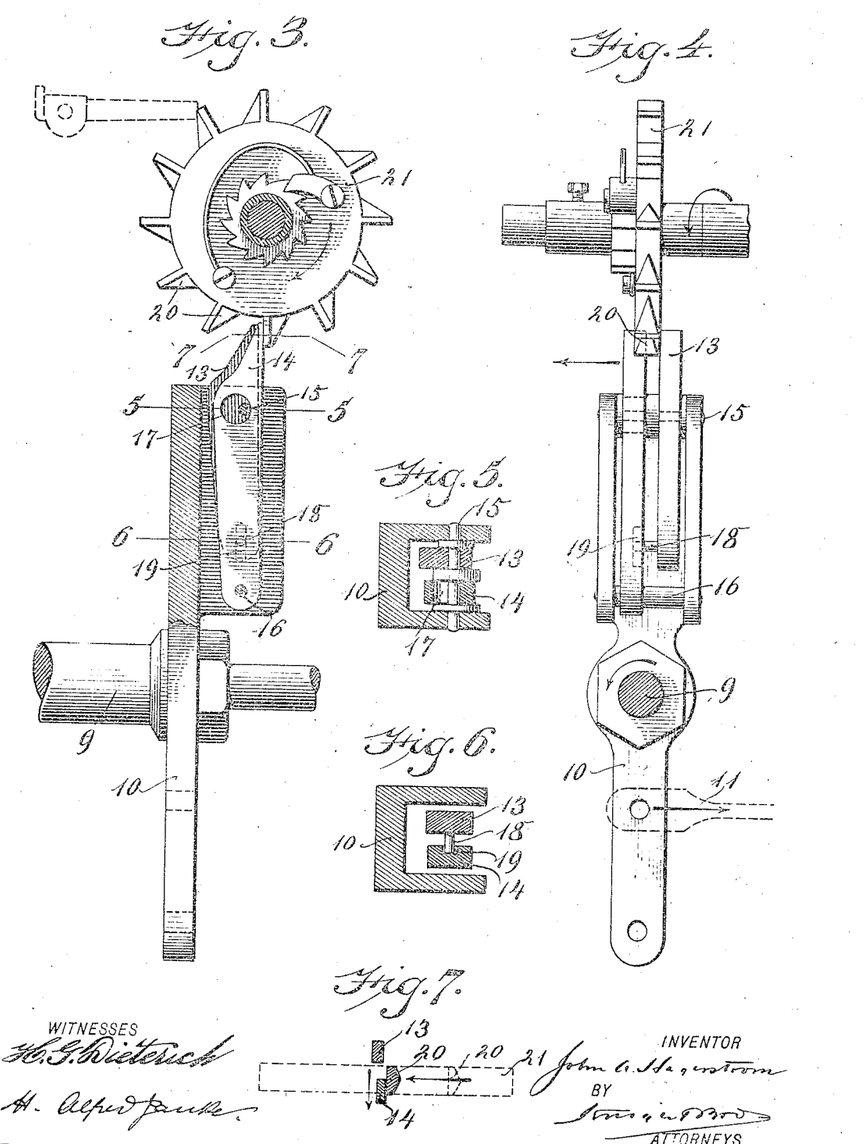
Fig. 3 is an enlarged detail view of the escapement mechanism.
Fig. 4 is a view at right angles thereto.
Fig. 5 is a sectional view of Fig. 3 on line 5—5.
Fig. 6 is a sectional view of Fig. 3 on line 6—6.
Fig. 7 is a diagram, indicating the relative position of the two dogs and the two teeth of Fig. 3 in plan view.

In Figs. 1 and 2, 10 is a rocking lever suitably pivoted in the machine frame at 9 and operated by the push and pull rod 11 from the universal bar 12 of the machine. The escapement mechanism which is operated by rocking lever 10 and shown in full view in Fig. 1, is illustrated in Figs. 3 and 4 in detail and in enlarged scale. As may be seen from these figures, lever 10 is U-shaped at its upper end, which is shown also in cross section, on lines 5—5 and 6—6 respectively in Figs. 5 and 6. Within this U-shaped head are pivoted dogs 13 and 14; dog 13 by pivot pin 15 as a lever of the first order and dog 14 by means of pin 16 as a lever of the second order. Furthermore, the throw of dog 14 is limited by having pivot 15 pass through the opening 17 of this dog. Dog 13 is guided at its lower end by pin 18 in a recess 19 provided in dog 14 so that when dog 14 is moved in one direction dog 13 will be positively moved in the other direction. The upper ends of dogs 13 and 14 are suitably shaped to engage the teeth 20 of escapement wheel 21 which may be suitably journaled and disposed in the machine frame and driven in any well known manner used in this kind of machine. It will be seen that wheel 21 thus forms the spaced member of the escapement mechanism, while rocking lever 10 with its dogs forms the detaining and spacing member of the mechanism.

In Figs. 3 and 4 tooth 20 is shown in engagement with dog 14, just having thrown this dog the farthest to the left on its rotation indicated by the arrow in Fig. 3. This has caused dog 13 to move the farthest to the right. If now rocking lever 10 is rocked in the direction shown by the arrows in Fig. 4 tooth 20 will slide off dog 14 and on dog 13 throwing this dog the farthest to the left, which will cause dog 14 owing to its connection with dog 13 above described to be thrown the farthest to the right as far as opening 17 will allow. In sliding with one tooth from dog 14 to dog 13 wheel 21 has made a small step forward. If now rocking lever 10 is moved opposite to the direction indicated by the arrows the tooth 20 now in engagement with dog 13 will slide off this dog behind dog 14 and be free so as to cause wheel 21 to move in the direction of the arrow. In the meantime dog 14 has come by the same rocking motion of lever 10 into the path of the next tooth, which will strike it, thereby also throwing dog 13, which is now free to move, in the opposite direction until dog 14 is stopped by pin 15 in opening 17 causing the wheel to perform a large step, whereafter both dogs assume again the position shown in Fig. 3, ready for the next cycle of movements as described above. The dimensions of the throw and movement of both dogs are proportioned so that when dog 13 is thrown the farthest to the right its face stands slightly behind that of dog 14 which is then thrown the farthest to the left (Fig. 3). This will facilitate the tooth in engagement with dog 14 to slide off this dog and on dog 13. Furthermore the throw of dog 14 to the right is far enough to allow a tooth in engagement with dog 13 to slide between dogs 13 and 14 when lever 10 is rocked oppositely to the direction shown by the arrows in Fig. 4.

Fig. 7 shows diagrammatically the instant at which rocking lever 10 is about to move in the direction of the arrow shown in Fig. 4 in order to cause tooth 20 to slide off dog 14 and on dog 13. Owing to their connection with each other, the relative movement of the two dogs is so, that when a tooth, in the at rest position of the machine in engagement with dog 14, slides off this dog and on dog 13, always a small step is performed by wheel 21, and on sliding off dog 13 and at the same time on engagement of the next tooth with dog 14 always a large step is performed by wheel 21, the sum of both steps being equal to the forward movement of the carriage one full letter space. Rocking lever 10 is disposed in the machine so that escapement wheel 21 performs its small step when any of the keys of the machine is pressed down, and the larger step when this key is released by the operator; the sum of these two steps being equal to the distance between two teeth of wheel 21 or also equal to the forward movement of the carriage the full space of one letter as stated already. The arrangement of moving the carriage the space of one letter in two unequal steps, the small step when a key is pressed down and the large step when this key is released, is commonly used in typewriting machines for writing at an average speed. It is well known that it is more advantageous for very fast writing, to have the carriage and thus the escapement wheel perform the large step when the key is pressed down, and the small step when the key is released. In order to obtain this reverse sequence of steps whenever desired by the operator I have provided the following means which are illustrated in Figs. 8 to 12.

Figures 8, 9, 10, 11, 12:
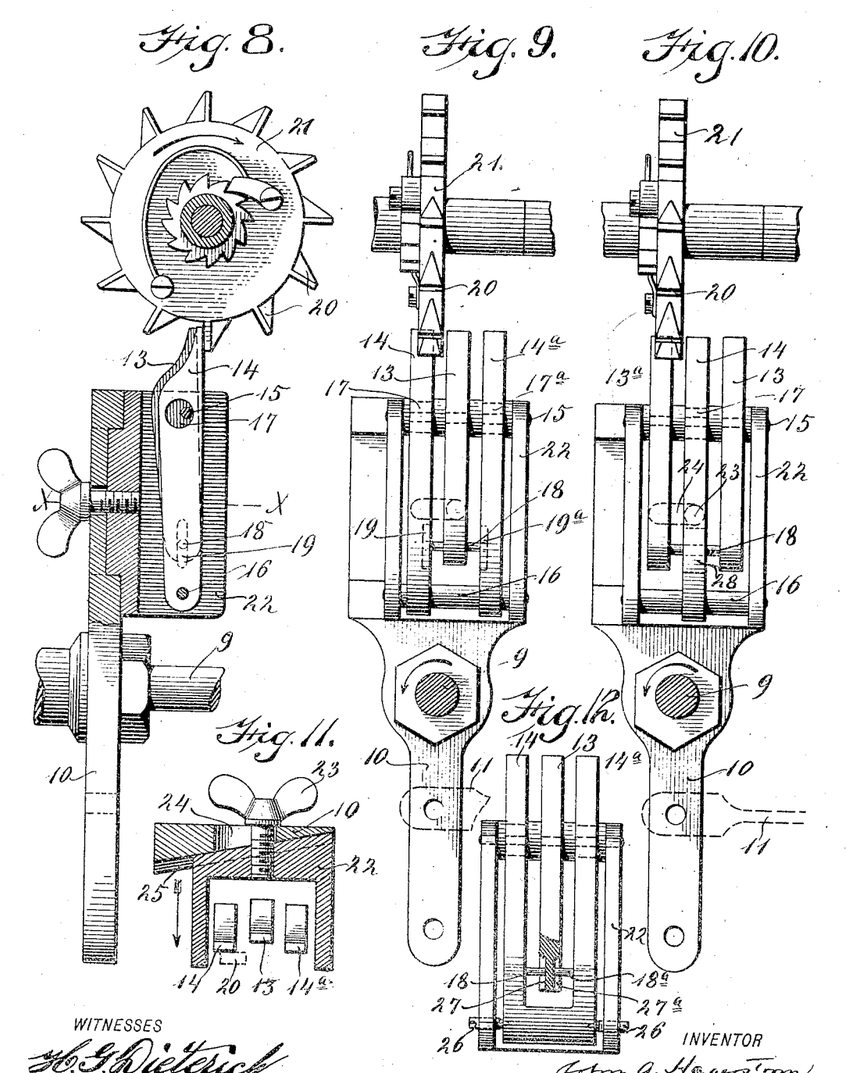
Fig. 8 is a modification of Fig. 3.
Fig. 9 is a view at right angles thereto.
Fig. 10 is a modified form of Fig. 9.
Fig. 11 is a sectional view of the cross section on line X—X of Fig. 8.
Fig. 12 is a modification of the dog structure shown in Fig. 10.

As shown in Figs. 8 and 9, 10 is the rocking lever operated from the universal bar as described before. The U-shaped head 22 which carries the dogs forms a separate part which is fastened to the upper end of lever 10 by means of a thumb-screw 23 so that it may slide transversely to the longitudinal axis of lever 10 in a direction transversely to the plane of rotation of wheel 21 on an incline, the purpose of which will be explained later on. Within the U shaped head 22 are pivoted dogs 14, 13 and 14$^a$ (Fig. 9). Dog 13 is pivoted again as a lever of the first order by means of pivot pin 15, while dogs 14 and 14$^a$ (in Fig. 8 only dog 14 can be seen) are pivoted as levers of the second order by means of pivot pin 16, to which both dogs are fixed in line with each other so that they will at any time perform their motion together. Furthermore dog 13 is guided at its lower end by means of pin 18 in recesses 19 and 19$^a$ of dogs 14 and 14$^a$ respectively. The throw of dogs 14 and 14$^a$ is limited in a similar manner as shown in Fig. 3 by having pivot pin 15 of dog 13 passing through openings, 17 and 17$^a$ of dogs 14 and 14$^a$ respectively. The purpose of having three dogs is to enable the operator to operate either with dogs 13 and 14 or with dogs 14$^a$ and 13 at will by sliding the U-shaped head 22 in slot 24 either to the left or to the right. Fig. 9 shows the U-shaped head 22 in a position to cause dogs 14 and 13 to control the step by step movement of escapement wheel 21. One of its teeth 20 is at the time abutting against dog 14 which has been thrown farthest to the left (in a similar manner as shown in Fig. 3) and thus caused dog 13 to move the farthest to the right (Fig. 8). If now by operating rocking lever 10, head 22 is rocked to the right (Fig. 9), the tooth abutting against dog 14 will slide off dog 14 and on dog 13 causing wheel 21 to perform a small step in the same manner as described before with regard to Fig. 3. If now rocking lever 10 is rocked in opposite direction, tooth 20, now in engagement with dog 13 will slide off this dog, escape behind dog 14 and be free so as to cause wheel 21 to move forward until the next tooth abuts against dog 14, which has been moved by the same rocking motion of lever 10 into the path of this tooth as described before. This will cause dog 13 to move oppositely to the direction in which the teeth approach the dogs and back into the position shown in Fig. 8 which shows the device when the machine is at rest. Also in this case the motions and relative movements of dogs 13 and 14 are proportioned so that when a tooth 20 is abutting against dog 14, thus throwing dog 13 in opposite direction as mentioned before, the face of dog 13 will be slightly behind that of dog 14 in the direction of the arrow shown in Fig. 8 so that when U-shaped head 22 is moved to the left by rocking lever 10 (Fig. 9) the tooth in engagement with dog 14 will easily slide off this dog and on dog 13, in the same manner as described before.

Assuming now that in operating with dogs 13 and 14, rocking lever 10 is disposed in the same manner as described with regard to Fig. 3, so that by depressing one of the keys of the machine, a tooth in engagement with dog 14 will slide off this dog and on dog 13 and by releasing the key, the tooth now in engagement with dog 13 will be freed and thus the escapement wheel will make first its small step and then its large step, the sum of which is equal to one letter space of the platen movement. This would be the position of the escapement device suitable for writing at ordinary speed. If now head 22 is shifted on rocking lever 10 to the left by moving thumb screw 23 in slot 24 (Fig. 11), dogs 13 and 14ª will now coöperate to control the step by step movement of escapement wheel 21 and it is evident that wheel 21 will make its larger step on depressing a key of the machine and the smaller step on releasing the key, since now the rocking of head 22 to the left will cause a tooth in engagement with dog 13 to be freed and thus the wheel 21 to perform the larger step while formerly a rocking of lever 10 to the left caused a tooth to slide from dog 14 to 13 and thus the wheel to perform a small step.

It has been stated before that the position shown in Fig. 8, that is with a tooth resting on dog 14 is the position which shows the device at rest and set for writing at ordinary speed. If now the operator desires to adjust the device for fast writing by shifting head 22 on lever 10 to the left (Fig. 11), the tooth in engagement with dog 14 will be caused to slide off this dog and on dog 13 on which it now stays when the machine is at rest. This has caused wheel 21 to perform a small step unintentionally and so in turn the carriage to move a small step forward in the writing direction. If this adjustment is made for instance by the operator at the beginning of a new line, several other lines being written with the device set for slower writing, this new line will not commence with the same margin as the other lines written but will have a margin which is larger by the space of a small step of the carriage. This small step could not be compensated by the operator by shifting the carriage back, since the carriage of machines commonly used can be shifted in either direction only a full letter space. In order to compensate for this lost small step head 22 is shifted on lever 10 on a surface 25 inclined at a suitable angle to the shifting direction (Fig. 11). If now head 22 is shifted from the right to the left in order to set the device for fast writing as described above head 22 will move at the same time in the direction indicated by the arrow in Fig. 11, which will bring the face of dog 13 on the same line on which the face of dog 14 is shown in engagement with dotted tooth 20. By this arrangement is obtained, that the tooth formerly in engagement with dog 14 has been caused to slide on dog 13 without causing the escapement wheel to perform a step, against which dog the teeth of wheel 21 now bear when the machine is at rest. On the other hand if the device is to be shifted from the position described above back into the position shown in Fig. 11 in order to set the machine from fast writing back to slow writing a tooth 20 now resting on dog 13 as described will slide off this dog and escape behind dog 14 the next tooth now bearing against dog 14 thus causing the wheel to perform a large step which is actually lost. But since head 22 is now being shifted down the incline 25 back into the position shown in Fig. 11, also a small step will be lost which in addition to the lost large step is equal to one full letter space which the wheel has caused the carriage to move forward in the writing direction when the device is set from fast writing back to slow writing. This lost space may now be easily compensated by the operator if necessary by shifting the carriage one letter space back before again starting to work.

While I have described above a particular arrangement of the dogs 13, 14, and 14ª relatively to each other, I do not wish to limit myself to this particular structure since the same purpose may be obtained by having for instance the dogs controlling wheel 21 disposed in the manner as shown in Fig. 10.

In the structure shown in this figure two dogs 13 and 13ª are pivoted as levers of the first order and coupled together by means of pin 18 forming their point of application, while only one dog 14 pivoted as a lever of the second order is provided and disposed between dogs 13 and 13ª. The throw of this lever is limited in the same manner as shown in Figs. 8 and 9 by pin 15 passing through opening 17 of dog 14 while the point of resistance of this dog is also located as shown in Figs. 8 and 9 by pin 18 passing through guide slot 28. In this modification the teeth of wheel 21 would abut when at rest normally, when the device is set for slow writing, against the middle dog 14, while in case of fast writing the teeth will abut when at rest against the outer dog 13ª as shown in Fig. 10.

Furthermore another modification may be made without departing from the spirit of my invention by having the dogs in Fig. 12 disposed relatively to each other as shown in Fig. 9 but the dogs 14 and 14ª made in one U shaped piece which is pivoted in head 22 by means of pivot screws 26 while the pin 18 shown in Fig. 9 fastened to dog 13 may be divided into two pieces 18 and 18ª fastened to dogs 14 and 14ª respectively and engaging in recesses 27 and 27ª respectively provided in dog 13 and forming its point of application.

While I have shown by way of illustration an escapement wheel as the movable or spaced escapement member, it is evident that any other well known form of movable or spaced escapement member, such as, for instance a straight rack, of which the escapement wheel 21 illustrated is only a curved variety, may be used in connection with my improved escapement mechanism, without departing from the spirit of my invention.

I claim:

1. In an escapement mechanism, the combination with an escapement wheel tending to rotate in one direction, a vibrating member disposed to operate transversely to the plane of rotation of said wheel having two dogs engaging each tooth of said wheel successively, said dogs interconnected to cause one dog when moved by said wheel to positively move the other dog oppositely to the direction of rotation of said wheel, and means for limiting the throw of said dogs.

2. In an escapement mechanism, the combination with an escapement wheel tending to rotate in one direction, a lever disposed to rock transversely to the plane of rotation of said wheel, having two dogs engaging each tooth of said wheel successively, said dogs interconnected to cause one dog when moved by said wheel to positively move the other dog oppositely to the direction of rotation of said wheel, and means for limiting the throw of said dogs.

3. In an escapement mechanism the combination with an escapement wheel tending to rotate in one direction, a vibrating member disposed to operate transversely to the plane of rotation of said wheel having two dogs engaging each tooth of said wheel successively, the first dog pivoted as a lever of the second order at one of its ends, the second dog pivoted as a lever of the first order intermediate its ends, said first dog having operative engagement intermediate its ends with the actuating end of said second dog, said first dog when moved by said wheel moving said second dog positively opposite to the direction of rotation of said wheel, and said second dog when moved by said wheel moving said first dog in said opposite direction, and means for limiting the throw of said dogs.

4. In an escapement mechanism the combination with an escapement wheel tending to rotate in one direction, a lever disposed to rock transversely to the plane of rotation of said wheel having two dogs engaging each tooth of said wheel successively, the first dog pivoted as a lever of the second order at one of its ends, the second dog pivoted as a lever of the first order intermediate its ends, said first dog having operative engagement intermediate its ends with the actuating end of said second dog, said first dog when moved by said wheel moving said second dog positively opposite to the direction of rotation of said wheel and said second dog when moved by said wheel moving said first dog in said opposite direction and means for limiting the throw of said dogs.

5. In an escapement mechanism, the combination with an escapement wheel tending to rotate in one direction, a vibrating member disposed to operate transversely to the plane of rotation of said wheel, having two dogs fixed together and a third dog pivoted between said two dogs, said inner dog and said outer dogs interconnected to cause said wheel when moving the inner dog in one direction to throw the outer dogs positively in the opposite direction of its rotation, and when moving either of the outer dogs to throw said inner dog positively in the opposite direction of its rotation, and means for limiting the throw of said dogs.

6. In an escapement mechanism, the combination with an escapement wheel tending to rotate in one direction, a lever disposed to rock transversely to the plane of rotation of said wheel, having two dogs fixed together and a third dog pivoted between said two dogs, said inner dog and said outer dogs interconnected to cause said wheel when moving the inner dog in one direction to throw the outer dogs positively in the opposite direction of its rotation, and when moving either of the outer dogs to throw said inner dog positively in the opposite direction of its rotation, and means for limiting the throw of said dogs.

7. In an escapement mechanism, the combination with an escapement wheel tending to rotate in one direction, a vibrating member disposed to operate transversely to the plane of rotation of said wheel, having two dogs fixed together and a third dog pivoted between said two dogs, said inner dog and said outer dogs interconnected to cause said wheel when moving the inner dog in one direction to throw the outer dogs positively in the opposite direction of its rotation, and when moving either of the outer dogs to throw said inner dog positively in the opposite direction of its rotation, means for limiting the throw of said dogs, and means causing the teeth of said wheel to coöperate with the inner dog and either of the outer dogs at will.

8. In an escapement mechanism the combination with an escapement wheel tending to rotate in one direction, a vibrating member disposed to operate transversely to the plane of rotation of said wheel having two dogs fixed together and a third dog pivoted between said two dogs, said outer dogs pivoted as levers of the second order at one of their ends, said inner dog pivoted as a lever of the first order intermediate its ends, said outer dogs having operative engagement intermediate their ends with the actuating end of said inner dog, said wheel when engaging and throwing each of the outer dogs in one direction causing the inner dog to move positively in the opposite direction of its rotation, and when engaging and throwing the inner dog in one direction causing said outer dogs to move in the opposite direction and means for limiting the throw of said dogs.

9. In an escapement mechanism the combination with an escapement wheel tending to rotate in one direction, a lever disposed to rock transversely to the plane of rotation of said wheel having two dogs fixed together and a third dog pivoted between said two dogs, said outer dogs pivoted as levers of the second order at one of their ends, the inner dog pivoted as a lever of the first order intermediate its ends, said outer dogs having operative engagement intermediate their ends with the actuating end of said inner dog, said wheel when moving and throwing one of the outer dogs in one direction causing the inner dog to move positively in the opposite direction of its rotation, and when engaging and throwing the inner dog in one direction causing said outer dogs to move in the opposite direction and means for limiting the throw of said dogs.

10. In an escapement mechanism, the combination with an escapement wheel tending to rotate in one direction, a vibrating member disposed to operate transversely to the plane of rotation of said wheel, having two dogs fixed together and a third dog pivoted between said two dogs, said outer dogs pivoted as levers of the second order at one of their ends, said inner dog pivoted as a lever of the first order intermediate its ends, said outer dogs having operative engagement intermediate their ends with the actuating end of said inner dog, said wheel when engaging and throwing one of the outer dogs in one direction causing the inner dog to move positively in the opposite direction of its rotation, and when engaging and throwing the inner dog in one direction causing said outer dogs to move in the opposite direction, and means causing the teeth of said wheel to coöperate with the inner dog and either of the outer dogs at will.

11. In an escapement mechanism, the combination with an escapement wheel tending to rotate in one direction, a vibrating member disposed to operate transversely to the plane of rotation of said wheel, having two dogs fixed together and a third dog pivoted between said two dogs, said inner dog and said outer dogs interconnected to cause said wheel when moving the inner dog in one direction to throw the outer dogs positively in the opposite direction of its rotation, and when engaging and moving either of the outer dogs to throw said inner dog positively in the opposite direction of its rotation, means for limiting the throw of said dogs, and a slide disposed on said vibrating member to be shifted transversely to the plane of rotation of said dogs causing the teeth of said wheel to coöperate with the inner dog and either of the outer dogs at will.

12. In an escapement mechanism, the combination with an escapement wheel tending to rotate in one direction, a lever disposed to rock transversely to the plane of rotation of said wheel, having two dogs fixed together and a third dog pivoted between said two dogs, said inner dog and said outer dogs interconnected to cause said wheel when engaging and moving the inner dog in one direction to throw the outer dogs positively in the opposite direction of its rotation, and when engaging and moving either of the outer dogs to throw said inner dog positively in the opposite direction of its rotation, means for limiting the throw of said dogs, and a slide disposed on said rocking lever to be shifted transversely to the plane of rotation of said dogs causing the teeth of said wheel to coöperate with the inner dog and either of the outer dogs at will.

13. In an escapement mechanism the combination with an escapement wheel tending to rotate in one direction, a vibrating member disposed to operate transversely to the plane of rotation of said wheel having two dogs fixed together and a third dog pivoted between said two dogs, said outer dogs pivoted as levers of the second order at one of their ends, the inner dog pivoted as a lever of the first order intermediate its ends, said outer dogs having operative engagement intermediate their ends with the actuating end of said inner dog, said wheel when engaging and throwing one of the outer dogs in one direction causing the inner dog to move positively in the opposite direction of its rotation, and when engaging and throwing the inner dog in one direction causing said outer dogs to move in the opposite direction, means for limiting the throw of said dogs and a slide disposed on said vibrating member to be shifted transversely to the plane of rotation of said wheel bearing the pivots of said dogs, causing the teeth of said wheel to coöperate with the inner dog and either of the outer dogs at will.

14. In an escapement mechanism the combination with an escapement wheel tending to rotate in one direction, a lever disposed to rock transversely to the plane of rotation of said wheel, having two dogs fixed together and a third dog pivoted between said two dogs, said outer dogs pivoted as levers of the second order at one of their ends, the inner dog pivoted as a lever of the first order intermediate its ends, said outer dogs having operative engagement intermediate their ends with the actuating end of said inner dog, said wheel when engaging and throwing one of the outer dogs in one direction causing the inner dog to move positively in the opposite direction of its rotation, and when engaging and throwing the inner dog in one direction causing said outer dogs to move in the opposite direction, means for limiting the throw of said dogs, and a slide disposed on said rocking lever to be shifted transversely to the plane of rotation of said dogs causing the teeth of said wheel to coöperate with the inner dog and either of the outer dogs at will.

15. In an escapement mechanism, the combination with an escapement wheel tending to rotate in one direction, a vibrating member disposed to operate transversely to the plane of rotation of said wheel, having two dogs fixed together and a third dog pivoted between said two dogs, said inner dog and said outer dogs interconnected to cause said wheel when engaging and moving the inner dog in one direction to throw the outer dogs positively in the opposite direction of its rotation, and when engaging and moving either of the outer dogs to throw said inner dog positively in the opposite direction of its rotation, means for limiting the throw of said dogs, and a slide disposed on said vibrating member to be shifted transversely to the plane of rotation of said dogs causing the teeth of said wheel to coöperate with the inner dog and either of the outer dogs at will, and means for compensating for the steps lost by said shifting motion.

16. In an escapement mechanism, the combination with an escapement wheel tending to rotate in one direction, a vibrating member disposed to operate transversely to the plane of rotation of said wheel, having two dogs fixed together and a third dog pivoted between said two dogs, said inner dog and said outer dogs interconnected to cause said wheel when engaging and moving the inner dog in the direction to throw the outer dogs positively in the opposite direction of its rotation, and when engaging and moving either of the outer dogs to throw said inner dog positively in the opposite direction of its rotation, means for limiting the throw of said dogs, and a slide bearing the pivots of said dogs, said slide disposed on said vibrating member to be shifted at a suitable angle to the plane of rotation of said wheel, causing when shifted the inner dog and either of the outer dogs to coöperate to control the step by step motion of said wheel at will and to compensate for the step lost by said shifting motion.

17. In a typewriting machine the combination of a spaced member having teeth and a detaining member and means for moving one of said members at right angles to the direction of movement of the spaced member, said detaining member comprising two dogs engaging each tooth of the coöperating escapement or spaced member successively, said dogs interconnected to cause one dog when engaged and moved by said teeth to positively move the other dog oppositely to the said direction of movement and means for limiting the throw of said dogs.

18. In a typewriting machine the combination of a spaced member having teeth and a detaining member and means for moving one of said members at right angles to the direction of movement of the spaced member, said detaining member comprising two dogs engaging each tooth of the coöperating escapement or spaced member successively, said dogs interconnected to cause one dog when engaged and moved by said teeth to positively move the other dog oppositely to the said direction of movement, the alternate engagement of said dogs causing the escapement mechanism to perform long and short steps successively, and means for limiting the throw of said dogs.

19. In a typewriting machine the combination of a spaced member having teeth and a detaining member and means for moving one of said members at right angles to the direction of movement of the spaced member, said detaining member comprising three dogs suitably pivoted and disposed to cause each tooth of its coöperating member to coöperate with the inner dog and either of the other dogs, said inner dog and said outer dogs interconnected to cause a tooth engaging and moving the inner dog to throw the outer coöperating dog positively opposite to the direction of movement and when engaging and moving either of the outer dogs to throw the inner dog positively in said opposite direction, and means for limiting the throw of said dogs.

20. In a typewriting machine the combination of a spaced member having teeth and a detaining member and means for moving one of said members at right angles to the direction of movement of the spaced member, said detaining member comprising three dogs suitably pivoted and interconnected to cause the teeth of said spaced member to coöperate with the inner dog and either of the outer dogs, the coöperation of said inner dog with one of said outer dogs causing said spaced member to perform alternately long and short steps, the coöperation of said inner dog with the other of said outer dogs causing said spaced member to perform alternately short and long steps, and means causing said change in coöperation.

21. In an escapement mechanism, the combination of a spacing escapement member, movable in one direction, and a detaining escapement member adapted to vibrate transversely to the direction of movement of said movable member, having a slide disposed to be shifted on said vibrating member in said transverse direction, said slide having three dogs suitably pivoted and disposed to cause the teeth of said movable member to coöperate with the inner dog and either of the outer dogs, the coöperation of said inner dog with one of said outer dogs causing said movable member to perform alternately long and short steps, the coöperation of said inner dog with the other of said outer dogs causing said movable member to perform alternately short and long steps.

22. In an escapement mechanism, the combination of a spacing escapement member, movable in one direction, and a detaining member adapted to vibrate transversely to the direction of movement of said movable member, having a dog adapted to permanently coöperate with the teeth of said movable member and two dogs adapted to selectively coöperate with the teeth of said movable member, the coöperation of said permanently operating dog with one of said selectively operating dogs causing the escapement mechanism to perform successively first a long and then a short step, the coöperation of said permanent operating dog with the other of said selectively operating dogs causing said escapement mechanism to perform successively first a short and then a long step, and means for compensating for the step lost by the change from one sequence of steps to the other sequence.

JOHN A. HAGERSTROM.

Witnesses:
G. W. CAMPBELL,
A. L. CAMPBELL.